May 5, 1959 C. W. LITTLETON 2,885,121
SEMI-AUTOMATIC INJECTOR FOR LIQUID FUNGICIDE
Filed March 19, 1957
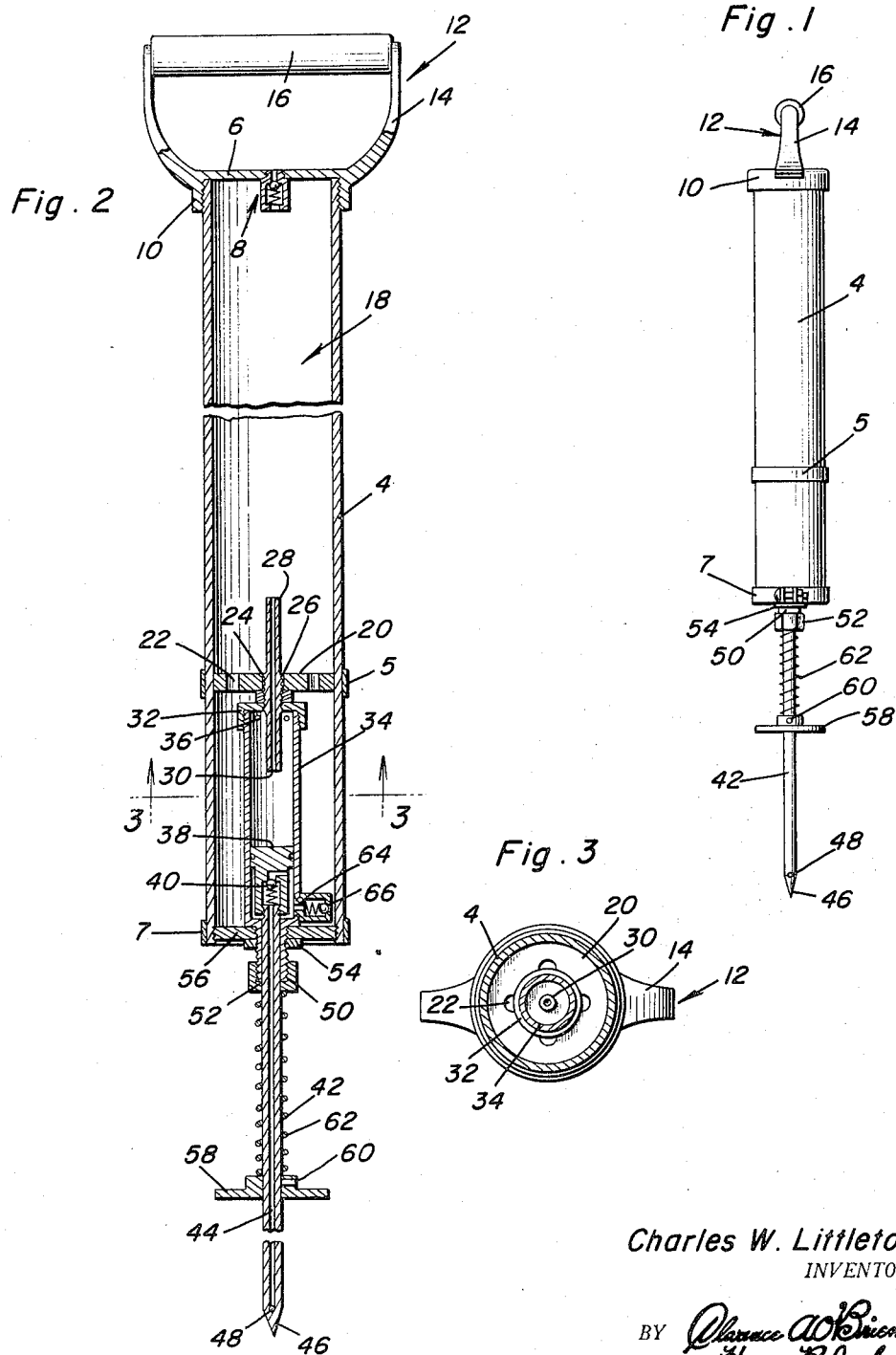
Charles W. Littleton
INVENTOR.

United States Patent Office 2,885,121
Patented May 5, 1959

2,885,121

SEMI-AUTOMATIC INJECTOR FOR LIQUID FUNGICIDE

Charles W. Littleton, Oviedo, Fla., assignor of one-third to Joseph A. Pinkard, Oviedo, Fla., and one-third to Raymond E. Miller, Orlando, Fla.

Application March 19, 1957, Serial No. 647,008

5 Claims. (Cl. 222—162)

The present invention relates to certain new and useful improvements in a fungicide container and injector which is expressly, but not necessarily, adapted to forcibly dispense a soil fumigant of one kind or another under the surface of a prepared or an equivalent bed of soil in a manner to promote pest control and the control, more specifically, of various injurious fungi and nematodes. As the preceding general statement of the subject matter of the invention implies many and varied styles and forms of liquid dispensing pressure-responsive injectors are old and well known. As a matter of fact, it is common in this art to appropriate and use a vertically elongated thrust type barrel which constitutes a container or reservoir for a liquid fumigant, fungicide or equivalent chemical pest control fluid having varying styles of handles and hand-grips to assist the user in lifting, plunging and otherwise thrusting the leading end of the barrel toward the ground or other area which is to be treated. Having a bored penetration needle or an equivalent thrust means on the leading end of a barrel, and so constructing the same that the liquid chemical is valved and delivered from the reservoir into the needle for injecting purposes is old.

An object of the invention is to structurally, functionally and otherwise improve upon portable manually actuatable injectors and, in so doing, to provide a simple, practical and expedient adaptation in which manufacturers will find their manufacturing economies and requirements met and, what is more important, users will find their pest control facilities effectually available and responsive to their varying needs.

In carrying out a preferred embodiment of the invention an advantageous and structurally distinct injector is provided. More specifically, the injector under advisement has to do with a construction which is extremely light in weight by reason of the simplicity of design and the lightweight but durable materials used which, for example, may take the form of commercial plastics and non-corrosive alloys. The barrel is preferably made of translucent or equivalent plastics so that the height of the fungicide or other chemical in the barrel is at all times visible.

Novelty is also predicated on a construction which provides for simplicity of dismantling for cleaning and also for adjustment of the amount of liquid for injection. The construction is such that proper placement of the fumigant at the desired depth is assured and regardless of the density of the ground no fumigant is ejected on the downward stroke inasmuch as the latter simply cocks the "gun" and loads the cylinder, injection being accomplished by releasing pressure on the bored needle by merely raising the gun vertically to withdraw the needle from the ground.

Further advantages found in this construction have to do with immediate and positive ejection the moment the "gun" is raised and prior to the vertical movement of the needle, and ease of operation. Height of the gun is such that it can be used without stooping. No additional pump handle is necessary to operate. One hand operation with one stroke serves to complete the needed cycle.

Other objects, features and advantages will become more readily apparent from the following description and the accompanying sheet of illustrative, but not restrictive, drawing.

In the accompanying drawing, wherein like numerals are employed to designate like parts throughout the views:

Fig. 1 is a side elevational view, on a relatively small scale, of a so-called semi-automatic injector for pest control liquid constructed in accordance with the invention and with the parts in normal ready-to-use position;

Fig. 2 is a view on a larger scale in which the parts appear in section and elevation and in which all of the parts are shown; and Fig. 3 is a cross-section on the plane of the line 3—3 of Fig. 2.

Referring now to the drawing and particularly to Fig. 2 the cylindrical barrel or casing is denoted by the numeral 4 and is closed at the otherwise open top by a closure disk 6 having a suitable spring-pressed check valve 8 constituting an appropriate vent. The closure disk includes a screw threaded rim 10 screwed on the screw threaded upper end portion of the barrel. A frame 12 is attached, the arms thereof carrying a suitable rotatable hand-grip 16. Thus it will be evident that the upper end of the barrel is appropriately valved and equipped with handle means. The space in the barrel constitutes a reservoir or container 18 for the liquid fungicide, insecticide or equivalent pest control fluid (not shown). Fixedly mounted in the lower half portion of the barrel is a divider plate 20 having constantly open ports 22 therein and provided at its center with a relatively large non-threaded hole 24. This hole serves to permit passage of the screw threaded intermediate portion 26 and upper end portion 28 of a piston stroke gaging and stop-forming tube 30. This tube is threadedly or otherwise adjustably connected intermediate its ends with a screw cap 32 mounted on the upper end of this cylinder of a pump cylinder 34. The upper end has suitable vents 36. A piston 38 is reciprocable in the cylinder and is provided with a ported spring closed ball check valve 40. The piston rod is denoted at 42 and has an axial passage 44 extending therethrough and communicating at its lower end with the pointed penetrating end 46 of the fluid discharge port 48. The pointed construction of the piston rod enables the latter to serve in the capacity of a penetrating and injecting needle similar, for example, to a hypodermic needle. The rod is communicatively connected with the valve means 40 and extends slidingly down through a screw threaded neck 50 on the lower end of the cylinder which neck is provided with a packing gland or equivalent means 52. The numeral 54 designates an assembling and lock nut carried by the neck and engaging the removable bottom or closure plate 56. The plate 56 and cooperating cylinder and piston means constitutes an assemblage which is removable from the barrel as a unit. This assemblage also includes the piston stroke gauging and stop tube 30. The fact is that this tube can be adjusted relative to the cylinder 34 so that the stroke of the piston 38 may be easily and successfully regulated and controlled. There is a penetration gauge and stop-plate or flange 58 provided and this has a collar which is held on the intermediate portion of the "needle" 42 by way of a setscrew 60. A coil spring surrounds the needle between the collar and the stuffing box 52, the spring being denoted at 62. Therefore the needle is spring biased as it were. Attention is also called to the fluid intake port or orifice 64 at the lower end of the cylinder which is constructed to accommodate a spring seated and closed ball check valve 66.

The operation of the injection gun or injector is as follows: A predetermined amount of the liquid which is to be injected is first regulated by setting the metering tube or rod 30. The matter of depth of injection of the needle into the ground or other area or surface to be treated is regulated by adjusting the setscrew 60 and stop plate or flange 58. The reservoir 18 is charged or filled with the chemical insecticide or liquid. After the closure cap 6 is replaced the ported vent 8 and handle means are in readiness for use. The pointed end 46 of the needle 42 is placed on the ground at the desired point of injection. By exerting slight pressure on the handle 16 the needle is pushed into the ground until the stop plate 58 comes into play. As pressure continues the piston 38 is moved up into the cylinder 34 and of course draws or sucks the fumigant into the cylinder by way of the valved port means 64 and 66. When the piston 38 has completed its travel it is stopped by coming directly into contact with the stop tube 30. The needle is extracted from the ground by lifting on the handle means. As pressure on the handle means is released and the device is raised vertically to withdraw the needle the coil spring 62 and the friction of the ground on the needle hold the needle in the ground. As the piston starts its downward stroke the check valve 66 closes and the check valve 40 opens due to the pressure applied thereto and forces the liquid past the open valve down the needle and out into the ground through the discharge port 48 at the pointed end of the needle. As soon as the piston and needle have completed their downward travel continued lifting of the handle extracts the needle from the ground and the device is automatically ready for the next cycle or injection requirement. Thus each amount of fluid which is trapped and pumped out is regulated or metered.

With reference now to the numeral 5 this denotes a reinforcing band which encircles the cylinder 4 in alignment with the divider plate 20. In some instances the invention might be of a material in which both the endless band 5 and divider plate are jointed together and to the cylinder. This, however, is an incidental aspect of the overall invention. Likewise it is perhaps desirable to provide a similar clamping band 7. This is located at the bottom of the cylinder and is a split band with the ends bolted together. It encircles the threaded portion of the cylinder and reinforces the cylinder and ensures retention of the closure plate 56.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A semi-automatic liquid chemical container and injector comprising, in combination, a barrel vented and provided with handle means at its upper end, said barrel being adapted to serve as a reservoir for the liquid chemical, a closing plate removably mounted in the lower end of said barrel, a cylinder extending axially into the reservoir and having a lower end portion adjustably and detachably mounted on said plate by way of a neck equipped with a packing gland, a valved piston slidable in said cylinder and having a longitudinally bored rod depending from its lower end and extending slidably down through and beyond said neck and having a ported penetrating point at its lower end, a coil spring surrounding said rod and bearing at its upper end against said packing gland, a flange mounted on the intermediate portion of said rod and serving as a thrust regulating member, said coil spring bearing at its lower end against said flange, said cylinder being provided at its lower end with a valved port communicating with said reservoir.

2. A semi-automatic liquid container and injector comprising, in combination, a barrel vented and provided with handle means at its upper end and providing a reservoir for the liquid, a closing plate removably mounted in the lower end of said barrel, a cylinder extending axially into and housed for operation in said reservoir adjustably and detachably mounted on said plate by way of a neck on the lower end of the cylinder, said neck having a packing gland connected thereto, a valved piston slidable and operable in said cylinder and having an axially bored rod depending from its lower end and extending slidably down through and beyond said neck and packing gland and having a discharge port and ground penetrating point at its lower end, said rod constituting an injection needle, a coil spring surrounding said rod and bearing at its upper end against said packing gland, a flange mounted on an intermediate portion of said rod and serving as a thrust regulating member, said coil spring bearing at its lower end against said flange, said cylinder being provided at its lower end with a valved port communicating with the space of said reservoir a ported divider and partitioning plate fixedly mounted in an intermediate portion of said barrel just above the upper end of said cylinder and having a central opening, a screw threaded tube adjustably mounted on the upper end of said cylinder and having a portion projecting slidably through the opening in said plate, the lower end portion of said tube projecting into said cylinder and constituting a stop limiting the upward stroke of the piston.

3. A chemical liquid container and injector comprising, in combination, an elongated barrel adapted to serve as a reservoir for the liquid which is to be dispensed and injected, a valved closing cap mounted on the upper end of said barrel, said cap being provided with a handgrip by way of which the barrel may be handled and maneuvered, a pump mounted on and carried by a closing plate removably secured in the lower end of said barrel, said pump embodying a cylinder confined for operation in said reservoir, a piston reciprocable in said cylinder, said cylinder being provided at a lower end portion with a valved liquid intake port communicating with said reservoir, said piston being provided with a valved port, an axially bored piston rod carried by said piston and communicable with said valved port, said piston rod having a discharge port and penetrating point at its leading end and constituting an injection needle, a flange mounted on said needle intermediate the ends of the needle and constituting a stop and serving to limit the degree of insertion of the needle into the ground, and a coil spring encircling said needle and bearing at one end against said flange.

4. The structure defined in claim 3, and a stop tube adjustably mounted in the upper end of said cylinder and having a portion projecting into the cylinder with which the piston is cooperably engageable so that the upward stroke of the piston may be stopped by said tube.

5. A semi-automatic liquid container and injector comprising, in combination, an elongated barrel vented and provided with handle means at the upper end of the barrel and providing a reservoir for the liquid to be dispensed and injected, a divider plate fixedly mounted in the barrel adjacent a lower end portion of the barrel, said plate having ports and a central opening, a closing plate removably mounted in the lower end portion of said barrel and spaced below said divider plate, a cylinder extending axially and confined in the barrel in the space between said plates, said cylinder being provided at its bottom with a screw-threaded neck passing through an opening in the closing plate, said neck provided on its lower end with a packing gland, said neck providing a guide, a valved piston slidable and operable in said cylinder and having an axially bored rod depending from its lower end and extending slidably down through and beyond said neck and packing gland and having a discharge port and ground-penetrating point at its lower end, said rod constituting an injection needle, a coil spring surrounding said rod and bearing at its upper end against said packing gland, a flange mounted on an intermediate portion of said rod and serving as a thrust regulating member, said coil spring bearing at its lower end against said flange, said cylinder being provided at its lower end with a valved intake port communicating with the space of said reservoir, and a screw-threaded tube having a median portion adjustably mounted on the upper end of said cylinder with a lower end portion projecting into the cylinder and constituting a stop which limits the upward movement of the piston in the cylinder, and having an upper end portion extending through the central opening provided therefor in said divider plate.

References Cited in the file of this patent

UNITED STATES PATENTS

| | | |
|---|---|---|
| 1,250,851 | Goldner | Dec. 18, 1917 |
| 1,271,490 | Servatius | July 2, 1918 |
| 1,868,235 | Jaden | July 19, 1932 |